United States Patent [19]
Bang et al.

[11] Patent Number: 5,715,163
[45] Date of Patent: Feb. 3, 1998

[54] CURSOR CONTROLLED NAVIGATION SYSTEM FOR AIRCRAFT

[75] Inventors: Eric S. Bang, Seattle, Wash.; John L. Groce, deceased, late of Kent, Wash., by Leslie L. Groce, executor; Robert E. Chaney, Bellevue, Wash.

[73] Assignee: The Boeing Company, Seattle, Wash.

[21] Appl. No.: 518,090

[22] Filed: Aug. 22, 1995

[51] Int. Cl.⁶ ................................................. G06F 165/00
[52] U.S. Cl. ...................... 364/444.2; 364/424.06; 364/448
[58] Field of Search ............... 364/448, 424.06, 364/444.2; 340/979, 995; 395/143; 345/157, 173

[56] References Cited

U.S. PATENT DOCUMENTS

| | | | |
|---|---|---|---|
| 4,086,632 | 4/1978 | Lions | 364/444 |
| 4,692,869 | 9/1987 | King et al. | 364/448 |
| 4,825,374 | 4/1989 | King et al. | 364/433 |
| 5,057,835 | 10/1991 | Factor et al. | 340/995 |
| 5,340,061 | 8/1994 | Vaquier et al. | 244/175 |

*Primary Examiner*—Michael Zanelli
*Attorney, Agent, or Firm*—James P. Hamley

[57] ABSTRACT

An aircraft navigation control system includes a flight management system control display unit (12), a navigation display unit (40), logic circuitry (60) and a cursor control input device (70). The flight management system control display unit (12) includes a keyboard (30) to allow desired route waypoint modification via keyboard entries. These entries appear on a display (20) which provides a text listing of the selected waypoints. The navigation display (40) produces a graphical depiction of the selected waypoints as provided on the flight management system control display unit (12). In addition, the user may modify or create a new desired route by movement of a cursor (4) on the navigation display (40) to thereby highlight and select various waypoints as depicted on the display (40). By use of this graphical interface via a cursor control device (70) and the cursor (74) on the navigation display (40), a user may create, by a connect the dot approach, a new desired navigation route. Changes so entered on the navigation display (40) by the cursor control device (70) correspondingly create changes in the text display of the control display unit (12).

13 Claims, 11 Drawing Sheets

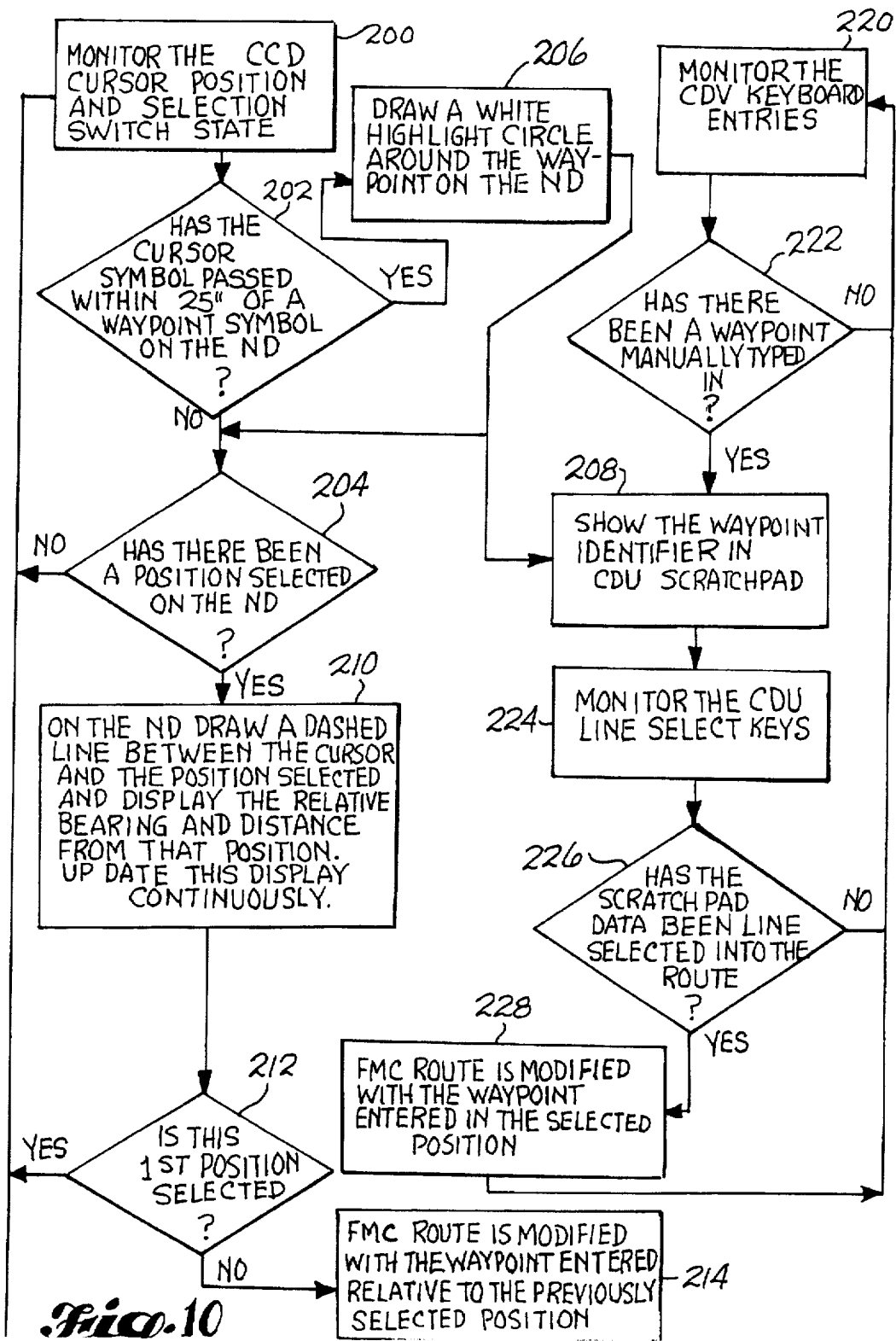

CURSOR CONTROLLED NAVIGATION SYSTEM FOR AIRCRAFT

BACKGROUND

The present invention relates to the aircraft navigation art and, in particular, to an improved aircraft navigation selection system which allows automatic entry and deletion of route determining waypoints by means of a manual input cursor control device.

In modern commercial aircraft, a flight crew makes flight plan entries and modifications through a Flight Management System-Control Display Unit (FMS-CDU). The FMS-CDU is an electronic module containing a keyboard on its lower face half and an electronic display on its upper face half. By keying entries into the keyboard, the flight crew can build or modify a route into the Flight Management Computer by typing in a series of waypoints which are then displayed, in text form, on the upper half of the FMS-CDU display.

An additionally provided display is a navigation (map) display. In contrast to the text display of the FMS-CDU, the navigation display graphically depicts the selected waypoints along a desired route. Thus, as the flight crew types in entries on the FMS-CDU, these are then displayed graphically on the navigation display.

The FMS-CDU mode of text entry of the desired plan can be cumbersome and frustrating to the flight crew depending upon the amount of information that needs to be typed and the user's proficiency. In addition, the sequence of typed commands require some training to familiarize the user with the method by which waypoints are entered, modified and deleted.

It would be highly beneficial, therefore, if flight plan entries could be made by the flight crew in a more user friendly, "point and click" type manner on the actual graphical navigation display, while maintaining the ability to use typed entries via the FMS-CDU.

SUMMARY OF THE INVENTION

It is an object of this invention, therefore, to provide an improved aircraft navigation route entry system wherein flight crew entries of a desired route are made via a user friendly, graphical input to a navigation display.

It is a further object of the above-described invention, to provide both graphic and standard text type inputs to create a desired navigational route.

It is yet a further object of the present invention to provide the above-described improved aircraft navigation route input system wherein users, via a cursor control device, can select, modify and delete waypoints on the navigational display. These and other objects of the invention will become apparent in view of the specification and claims set forth hereinbelow.

Briefly, according to the invention, an aircraft cursor control navigation system comprises a navigation display for graphically displaying to the flight crew a sequence of waypoints defining a desired aircraft route. The navigation display also depicts a movable cursor. A manual input cursor control device is provided which is suited for receiving manual inputs from the flight crew to control the position of the cursor on the navigational display. A control display unit includes a keypad for allowing the typed entry of sequential waypoints to define a desired aircraft route and it also includes a text display of the typed entries. A provided logic means directs aircraft flight in accordance with a flight crew input desired route. The logic means includes logic for allowing the flight crew to select a new or revised desired route by manually selecting waypoints via the cursor control device with the newly selected waypoint automatically forming the desired route on both the navigation display and as a new or revised text display on the Control Display Unit.

In yet a further aspect of the invention, the logic includes means for drawing a line between the first and second selected waypoints on the navigation display and calculating and displaying the relative bearing and distance from the first selected waypoint to the second selected waypoints.

In yet a further aspect of the invention, the logic determines if a cursor has been positioned within a predetermined distance of a waypoint and, if so, highlights the waypoint on the flight display.

In yet a further aspect of the invention, the aforedescribed logic includes means for producing a text display on the control display unit of a highlighted waypoint.

In yet a further aspect of the invention, the aforedescribed logic includes means permitting the flight crew to select the text display of the highlighted waypoint as a desired point on the route to thereby automatically enter the waypoint on the desired route.

In yet a further aspect of the invention, the logic includes means for creating images of one or more predetermined control buttons on the navigation display responsive to the system's current mode of operation and means for performing the operation represented by the control button image in the event a user, through manual input of the cursor control device, selects the control button.

Other aspects of the present invention will become more apparent upon reading the specifications and claims that follow.

BRIEF DESCRIPTION OF THE DRAWINGS

FIG. 10 is a logic flow diagram illustrating the manner by which the logic, in accordance with the preferred embodiment of the invention, provides user entry both graphically and via text inputs on the navigation display and control display unit, respectively.

DETAILED DESCRIPTION

Figure 1:
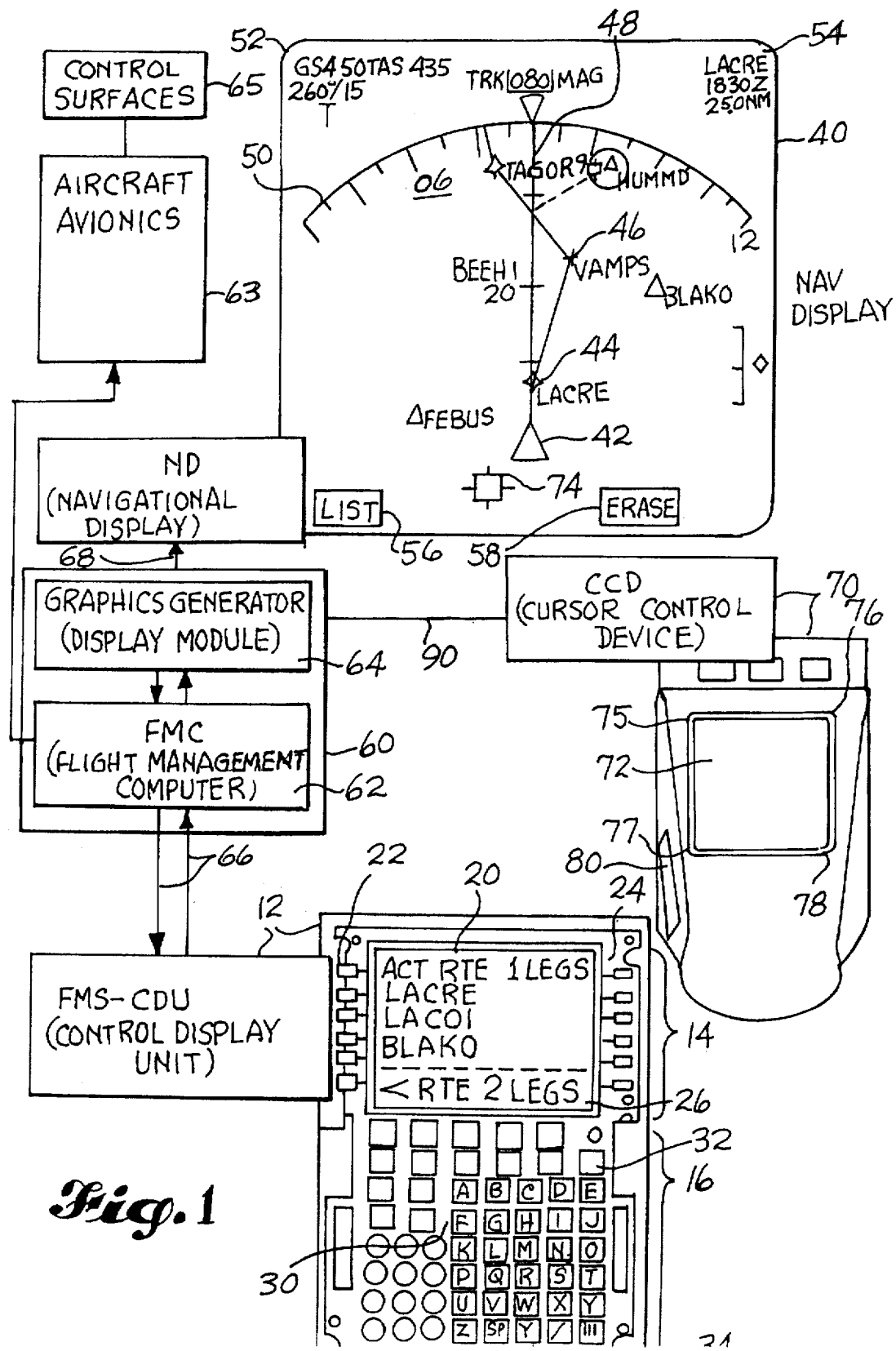
FIG. 1 is a diagram illustrating the general appearance and relative interconnection of the cursor control device, navigation display, control display unit and logic module in accordance with the preferred embodiment of the invention.

FIG. 1 illustrates in both graphic and block diagram form the primary components of the preferred embodiment of the invention. Shown at 12 is a conventional aircraft navigational Flight Management System-Control Display Unit (FMS-CDU) 12. The FMS-CDU 12 includes an upper face portion 14 and a lower face portion 16. In its upper face portion 14, the FMS-CDU 12 includes an electronic display 20 which is capable of displaying lines of text entered by the flight crew. These lines of text depict, typically, waypoints along the way of the desired navigational route. On both sides of, and adjacent to the electronic display 20 are line select keys, indicated generally at 22 and 24. Upon the user activating one of the line select keys 22, 24, the adjacent line of text on the electronic display is activated to thereby allow entry, selection or deletion of text.

At the lower portion of the electronic display is a scratch pad line 26 which displays system generated messages, entries via the keyboard (described below), and data being moved from one line to another.

In the lower face half 16 of the FMS-CDU 12 is a keyboard, indicated generally at 30. The keyboard includes an array of keys as well as control inputs by which the flight crew can manually enter waypoints, which then appear on the electronic display 20 as text line items. Also included are various control keys which allow the flight crew to add, modify and delete various entries.

For example, a provided Execute key 32 is a momentary action pushbutton which becomes illuminated to indicate a modification to the active route. Upon the flight crew pushing the Execute key 32, a desired modification is activated and illumination of the key is extinguished.

A provided Delete key 34 is a momentary action switch which, when activated by the flight crew, enters DELETE in the scratch pad portion 26 of the electronic display 20 When the scratch pad is blank, selection of a subsequent line by the line select keys 22, 24 deletes data on the corresponding adjacent line if such information is deletable.

Thus, by way of typed entries via the keypad 30, the flight crew enters waypoints along the desired navigational route. These waypoints are displayed as lines of text on the electronic display 20. Prior to the present invention, navigational routes were entered by the flight crew strictly through the FMS-CDU as depicted in FIG. 1. Such entries were often tedious or cumbersome due to the need to make the typed entries and the requirement that the users be familiar with the protocols for adding, modifying and deleting waypoints using the control key inputs.

Also provided as a display to the flight crew of the desired navigational route is a navigation display 40. The navigation display 40 depicts the current position of the aircraft, here indicated by triangle 42, and selected waypoints along the desired route such as the indicated waypoint "LACRE" at 44, the next selected waypoint "VAMPS" at 46 and the final waypoint "TAGOR" at 48.

In addition to the route information, also depicted on the navigation display 40 is the current magnetic track heading 48 and an arcuent line 50 which depicts a portion of a compass rose.

Also depicted in the upper left hand corner of the display 40 is information indicating the current ground speed, true air speed, wind speed and wind heading information, in upper left hand corner 52.

In upper right hand corner 54 is depicted the next waypoint along with estimated time of arrival information and the total distance to the next waypoint.

A particular feature of the present invention is that control button images, such as LIST button 56 and ERASE button 58 also appear on the navigation display 40 for selection by the user as opposed to keyboard entry on the FMS-CDU 12. In addition, the appearance of control buttons, such as buttons 56 and 58, is context sensitive to the mode that the navigation display has been activated to. Thus, inappropriate control buttons will not be displayed in a given mode of operation.

The navigation display 40 and FMS-CDU 12 interconnect through a logic module indicated generally at 60. The logic module 60 includes a flight management computer (FMC) 62. In addition, the logic includes a graphics generator (display module), 64. Inputs from the logic module 60 to and from the FMS-CDU 12 are carried along a two-way bus 66, whereas display information from the graphics generator 64 are carried to the navigation display 40 via a one-way bus 68.

A particular enhancement that the present invention provides to the navigation art is that user inputs to the system can be provided via a cursor control device indicated at 70. While several different types of cursor control devices are known to the art, such as joysticks, track balls and so forth, in this, the preferred embodiment of the invention, use is made of a track pad cursor control device which is described in great detail in U.S. patent application Ser. No. 08/128, 985, filed Sep. 28, 1993 and assigned to the same assignee as the present application, hereby incorporated by reference herein. Briefly, the cursor control device as described in the copending patent application includes a track pad 72. The track pad 72 is a capacitive touch pad device which senses relative movements of a user's finger thereacross. Thus, referring to the cursor 74 as depicted on the navigation display 40, a user, by dragging his or her finger across the track pad 72 determines the relative movement of the cursor 74 on the display 40. The cursor movement is relative. That is, if a user drags his or her finger to the right the cursor will move to the right correspondingly. If a user then removes his or her finger from the track pad 72, replaces it on the track pad 72 and again moves it to the right, the cursor will continue moving to the right corresponding to the finger movement.

In addition to the relative mode action of the track pad 72, the cursor control device is programmed such that placing a finger in any one of the four corners 75–78 of the track pad 72 activates a "hot pad" function which automatically drives the cursor, despite its previous location, to a corresponding one of the corners of the navigation display 40. In this way, the flight crew can instantly relocate the cursor. Also, in the event the flight crew wishes to position the cursor 74 over one of the command buttons, such as buttons 56, 58 it may be easier to do so by initiating the cursor at one of the corners of the display 40.

In a manner described more fully hereinbelow, a user activates a function, such as a control button 56, 58 or a selection of a new waypoint, such as waypoint 44, by depressing a select button 80 which is provided on the side of the cursor control device 70.

Data from the cursor control device passes to the logic module 60 via the bus 90. Specific operation of the cursor control device 70 as a user controlled input to the navigation system is described more fully hereinbelow. However, the overall philosophy is to provide a graphical interface to the flight management computer 62 of the logic unit 60 by use of selection of waypoints or activation of the command buttons, or soft keys which appear on the navigation display 40 to thereby allow the flight crew to interact with the navigation system graphically rather than by means of hardware buttons. This allows increased flexibility, such as the ability to allow the flight crew to activate only those command buttons, as appear on the navigation display 40, which are currently available based on the context of the task being performed. For example, the EXECUTE or ERASE buttons would only appear on the navigation display 40 after a route modification has been initiated.

Also, as is described more fully hereinbelow, as the flight crew enters a revised or new flight path by graphically entering waypoints via the cursor control device 70 on the navigation display 40, the corresponding waypoints and corresponding route are simultaneously entered into the control display unit 12 textual display. Thus, the flight crew can enter the desired route either graphically through the cursor control device 70 on the navigation display 40 or in parallel by use of the Control Display Unit 12. That is, changes either of the desired route either through the Control Display Unit 12 or the cursor control device 70 graphical input on the navigational display 40 creates parallel changes to both the navigation display 40 and the Control Display Unit 12.

The flight management computer 62 interfaces with the aircraft avionics 63 which in turn, activate the aircraft's control surfaces 65 in the normal manner such that the aircraft is directed to automatically fly the route as selected by the flight management computer 62.

FIGS. 2a through 9 depict the manner by which a flight crew may select or modify the desired navigation route as depicted in the FMS Control Display Unit electronic display 20 and, in parallel, the navigation display 40.

Figure 2A:
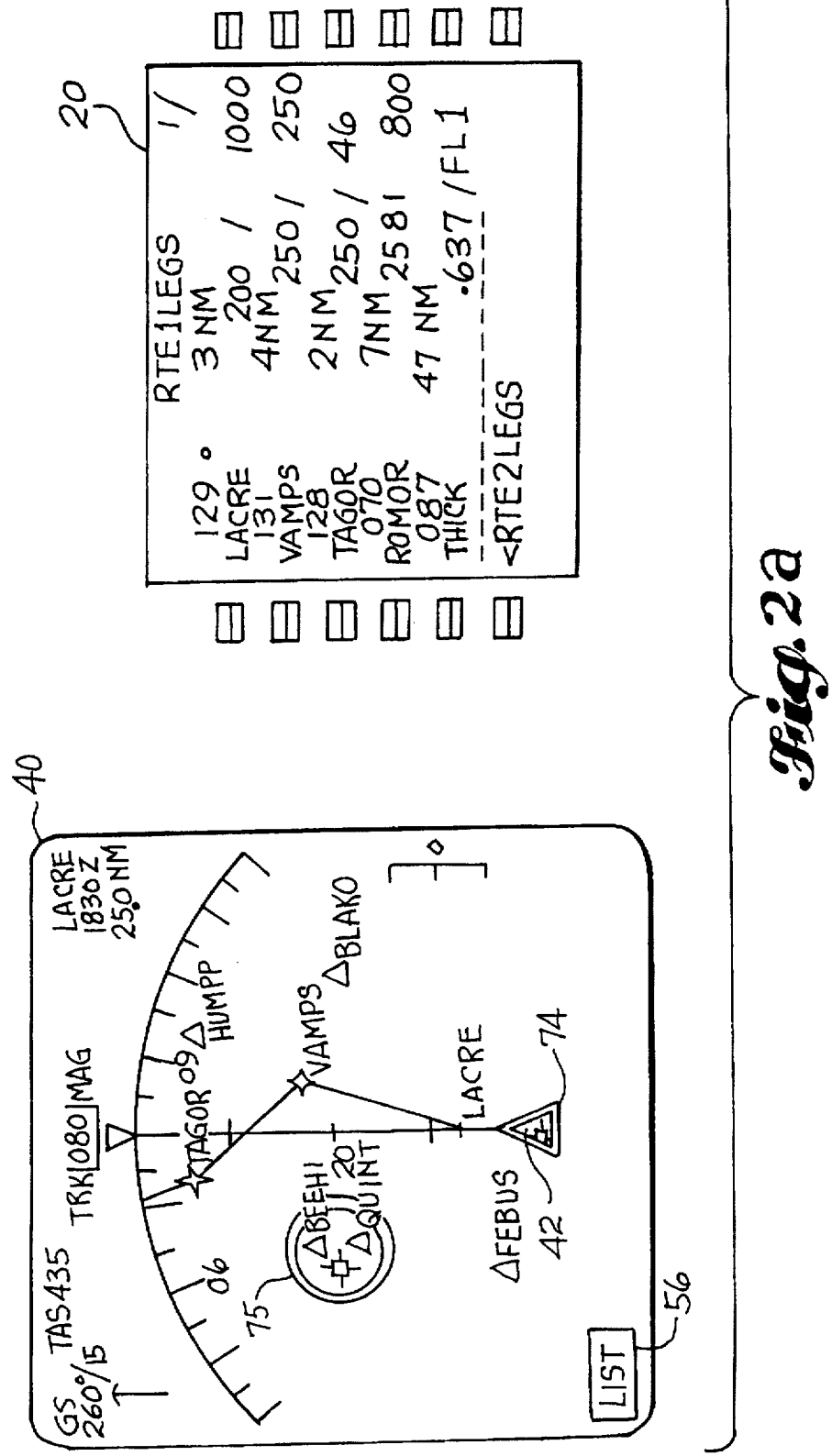
FIGS. 2a through 9 depict changes to the navigation display and control display unit to illustrate the manner by which the cursor control device can be used to change the desired route both as graphically represented on the navigational display and as depicted by text entries in the control display unit.

Referring to FIG. 2a, the operator, using the cursor control device 70 of FIG. 1, has located the cursor 74 to be within the aircraft symbol 42. The logic (60 of FIG. 1) responds by highlighting the airplane symbol 42 with a white border. If the flight crew desires to enter a "direct to" command, it would then activate the selector switch (80 in FIG. 1) on the side of the cursor control device. If, however, it was desired to create a downstream modification to the flight plan, the user would use the cursor control device to move the cursor to that waypoint at which the modification to the flight plan would be initiated. Note also that the "List" control button image appears on the navigation display 40. Where a user to move the cursor to the list control button 56, and activate the selector switch, the logic 60 would list on the navigation display all waypoints within the area of interest.

Figure 2B:
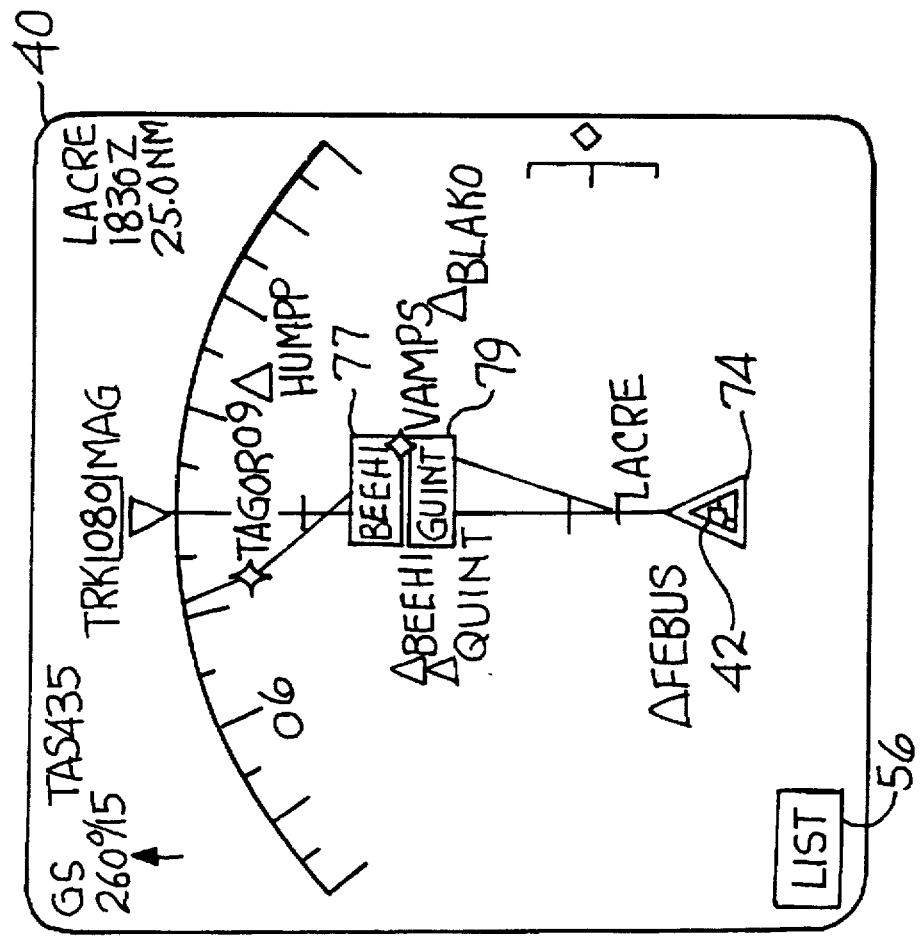

FIGS. 2a and 2b illustrate another aspect of the present invention. Shown generally at 75 are overlapping waypoints BEEHI and Quint. These waypoints are close enough that individually selecting one is not feasible.

Thus, as shown in FIG. 2b, if a user selects the highlighted waypoints (as indicated by the double circle 75 in FIG. 2a), the system automatically responds by displaying discrete control buttons 77, 79 on the navigation display. Each control button 77, 79 corresponds to one of the waypoints BEEHI and Quint. Now a user can select the desired one of the overlapping waypoints.

If more than two waypoints overlap, the system produces a discrete control button of each waypoint.

Figure 3:
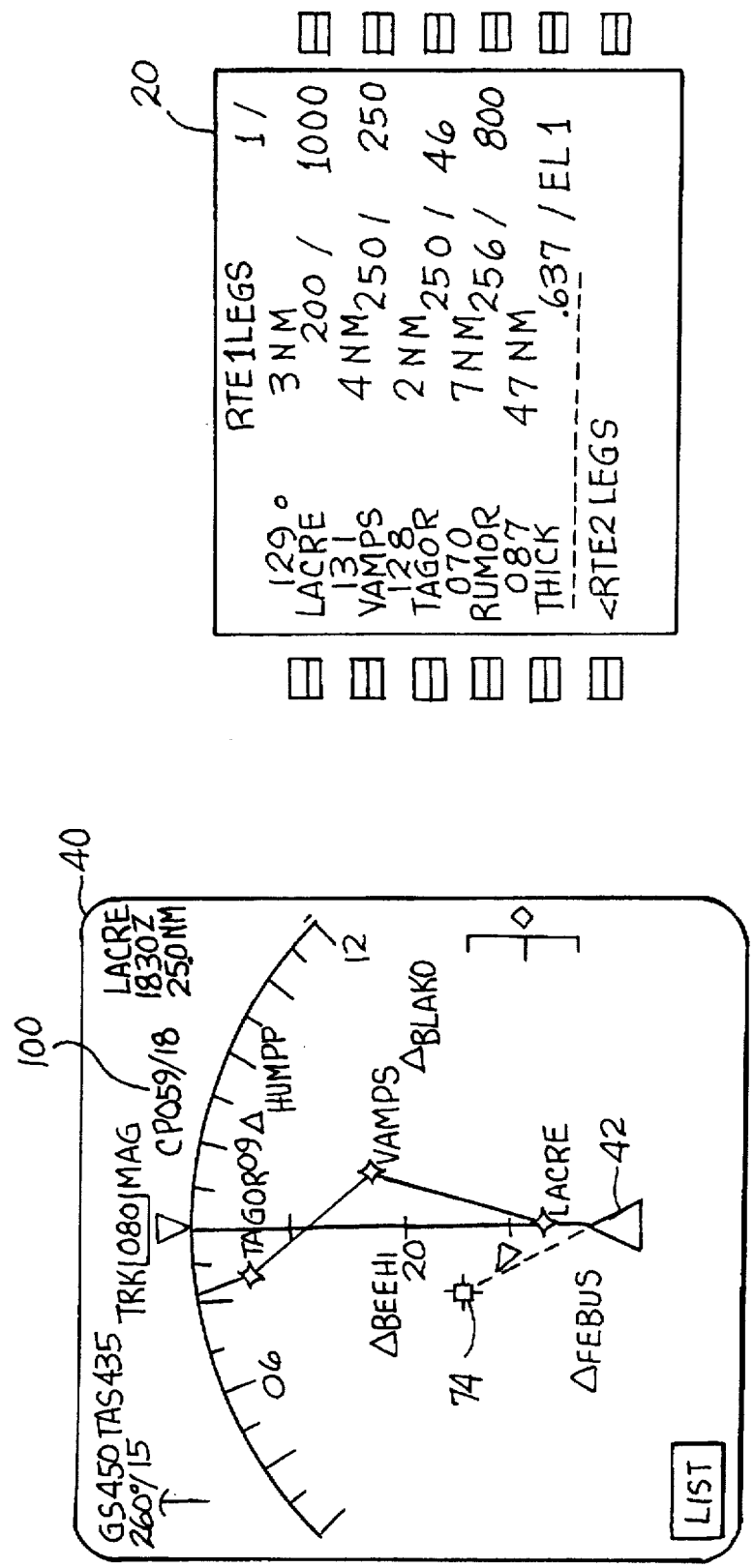

Referring to FIG. 3, the user, using the cursor control device, has now moved the cursor 74 from the anchor, or last selected position to a current desired position. Note that the logic 60 has generated a dashed line connecting the original anchor position 42 to the new cursor position 74. In addition, the logic 60 has calculated a real time bearing/distance readout of cursor position from the last selected point and is displaying it at position 100. No change, however, is reflected in the control display unit electronic display 20.

Figure 4:
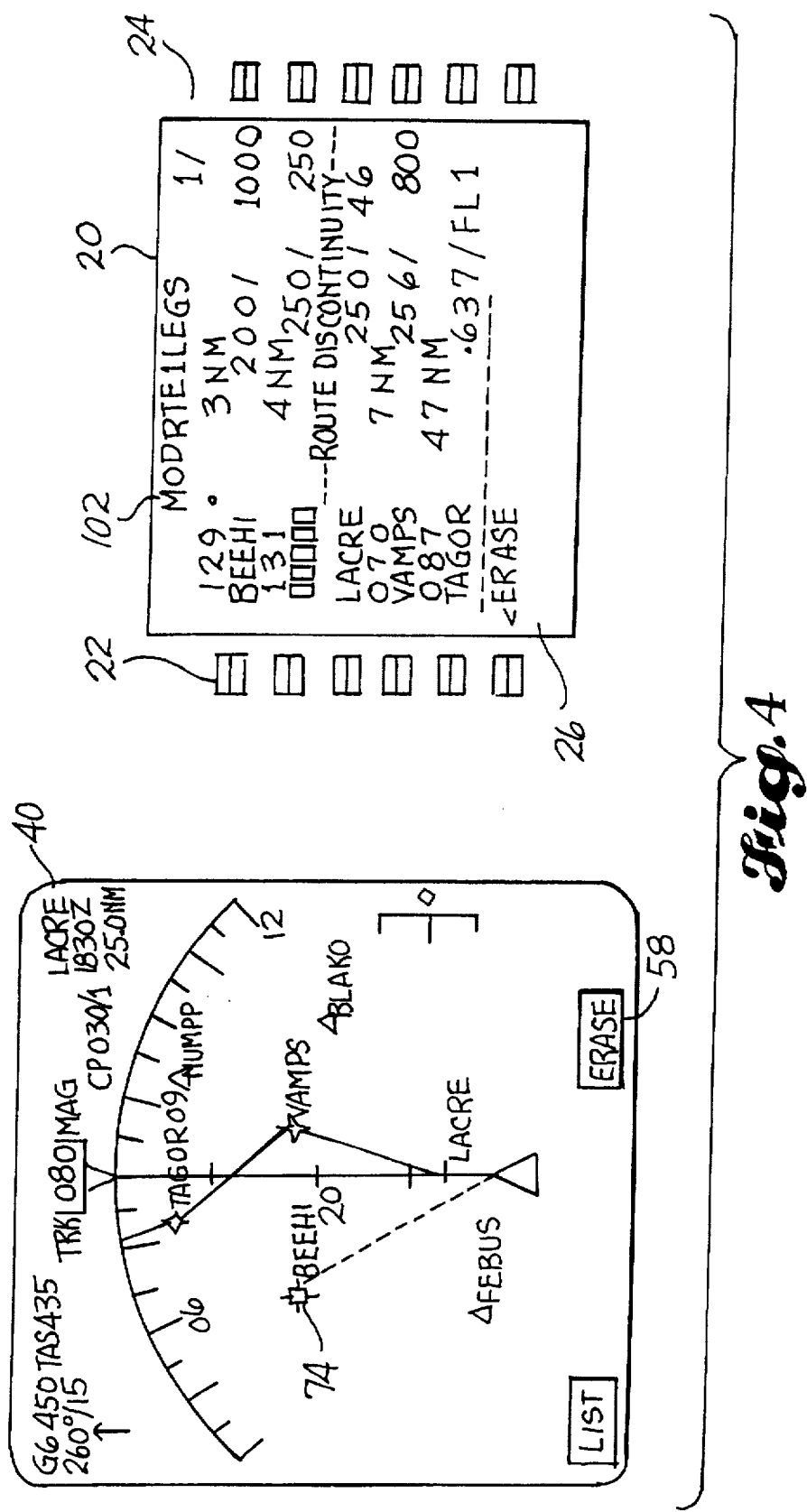

Now referring to FIG. 4, the user has moved the cursor to an actual waypoint, here designated as "BEEHI". In addition, this new waypoint has been selected by activation of the cursor control device selector switch 80, thereby indicating that the user desires a route change through the new waypoint. This new waypoint is now entered in the control display unit electronic display 20 and the display reflects, at 102, that a modification or "Mod" of the flight plan is underway. Note also that the electronic flight display 20 also indicates a route discontinuity.

In addition, now that a new leg has been selected, the scratch pad line 26 of the control display unit 20 indicates "ERASE" and, on the flight display 40 an erase control button image 58 appears. Thus, by appropriate activation either of the erase button 58 via the cursor control device, or of the appropriate line select keys 22 a user can opt to erase an unwanted modification.

Figure 5:
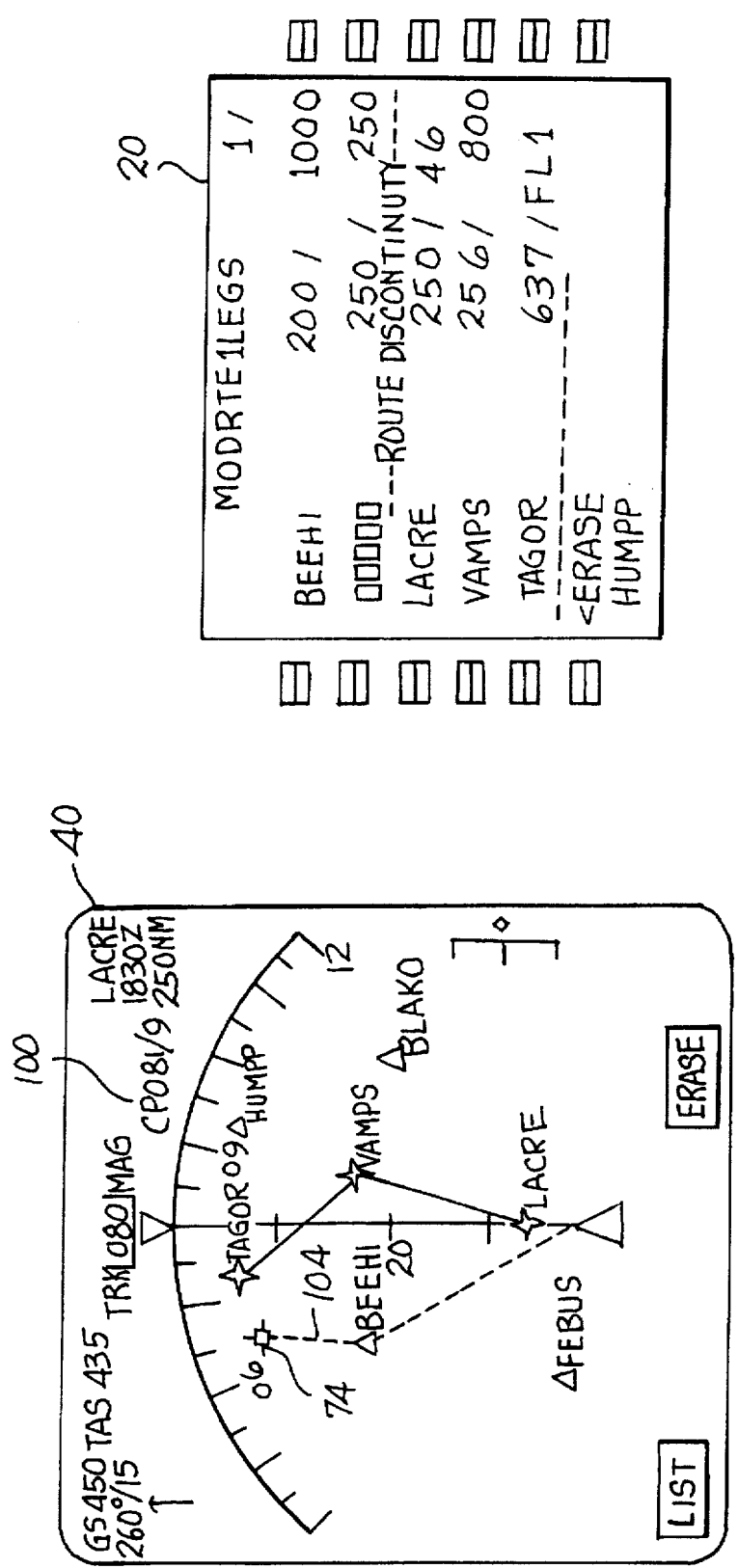

As shown in FIG. 5, a particular feature of the present invention is that as the cursor 74 is brought within a diameter of approximately one half inch from a potential waypoint, that waypoint is identified on the navigation display 40. If there are multiple waypoints within the half inch diameter of the cursor location, these will automatically be displayed as a list on the navigation display 40 for possible selection by the user via the cursor control device.

As shown in FIG. 5, having selected the new "BEEHI" route, the user continues to move the cursor 74 to select an additional waypoint on the desired route.

Figure 6:
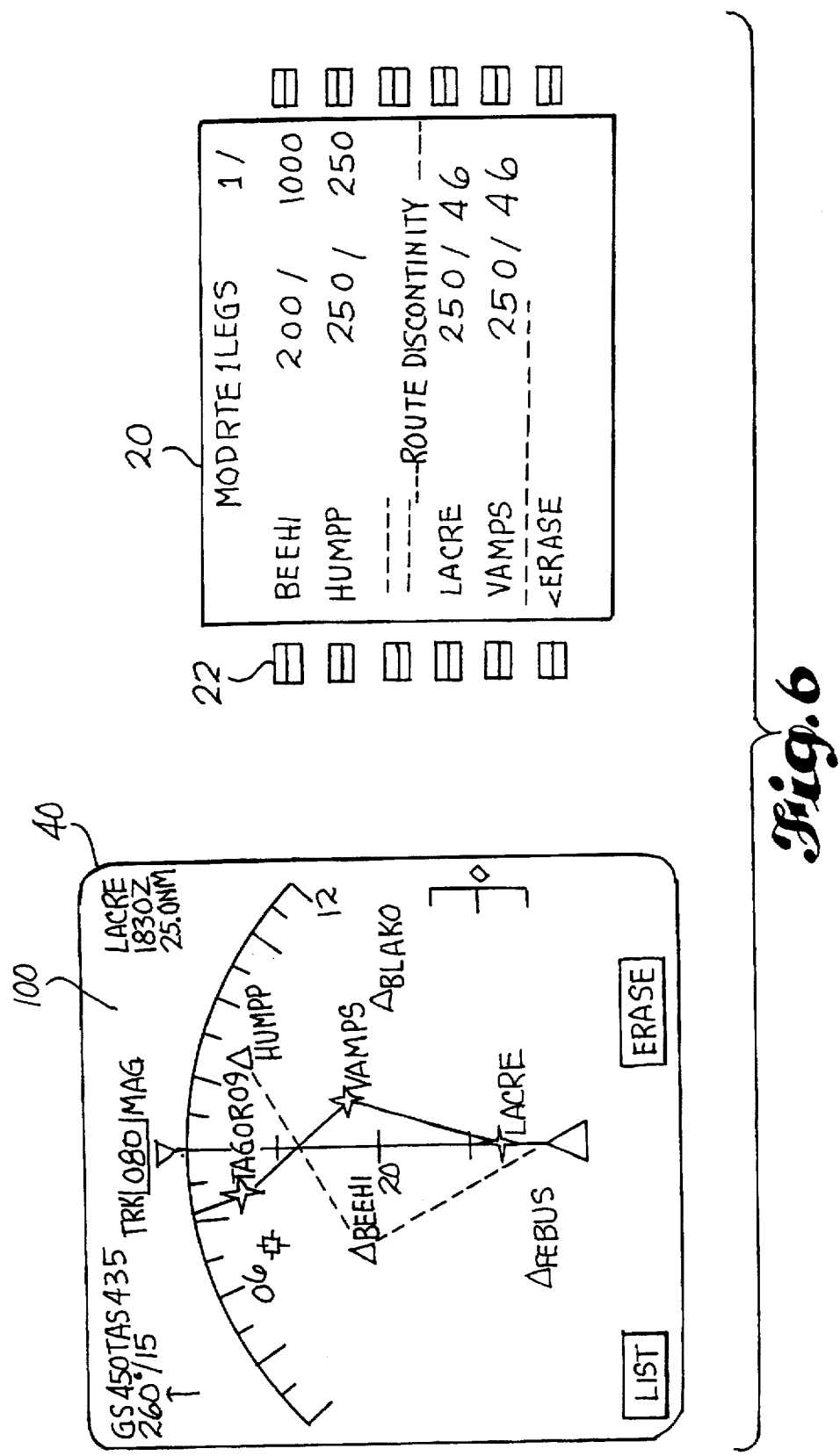
Figure 7:
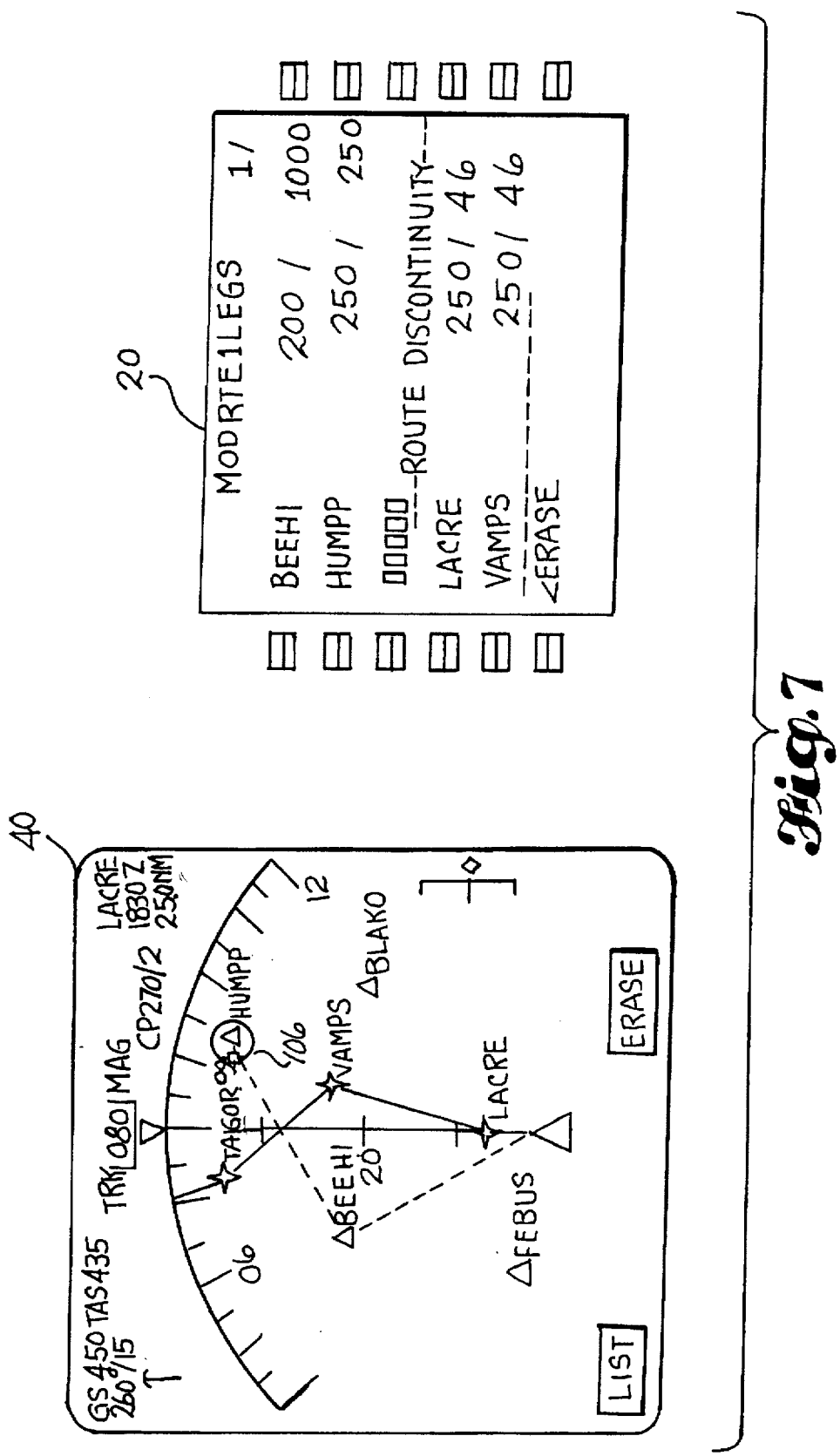

FIG. 6 depicts the fact that inputs can continue to be made not only via the cursor control device on the navigation display 40 but also via the FMS-CDU (12 of FIG. 1). Here, via a manual line select via line select switches 22, the user has utilized the CDU entry to clear the anchored position of the display whereby the real-time-line, 104 of FIG. 5, and position reading, at position 100 have fully cleared.

Now, as shown in FIG. 7, the user again uses the cursor control device to select a waypoint HUMPP at 106. In response thereto, the logic sets a new anchor point and creates a real-time-line from the previous waypoint BEEHI to the new position HUMPP. No corresponding change is noted on the navigation display 20.

Figure 8:
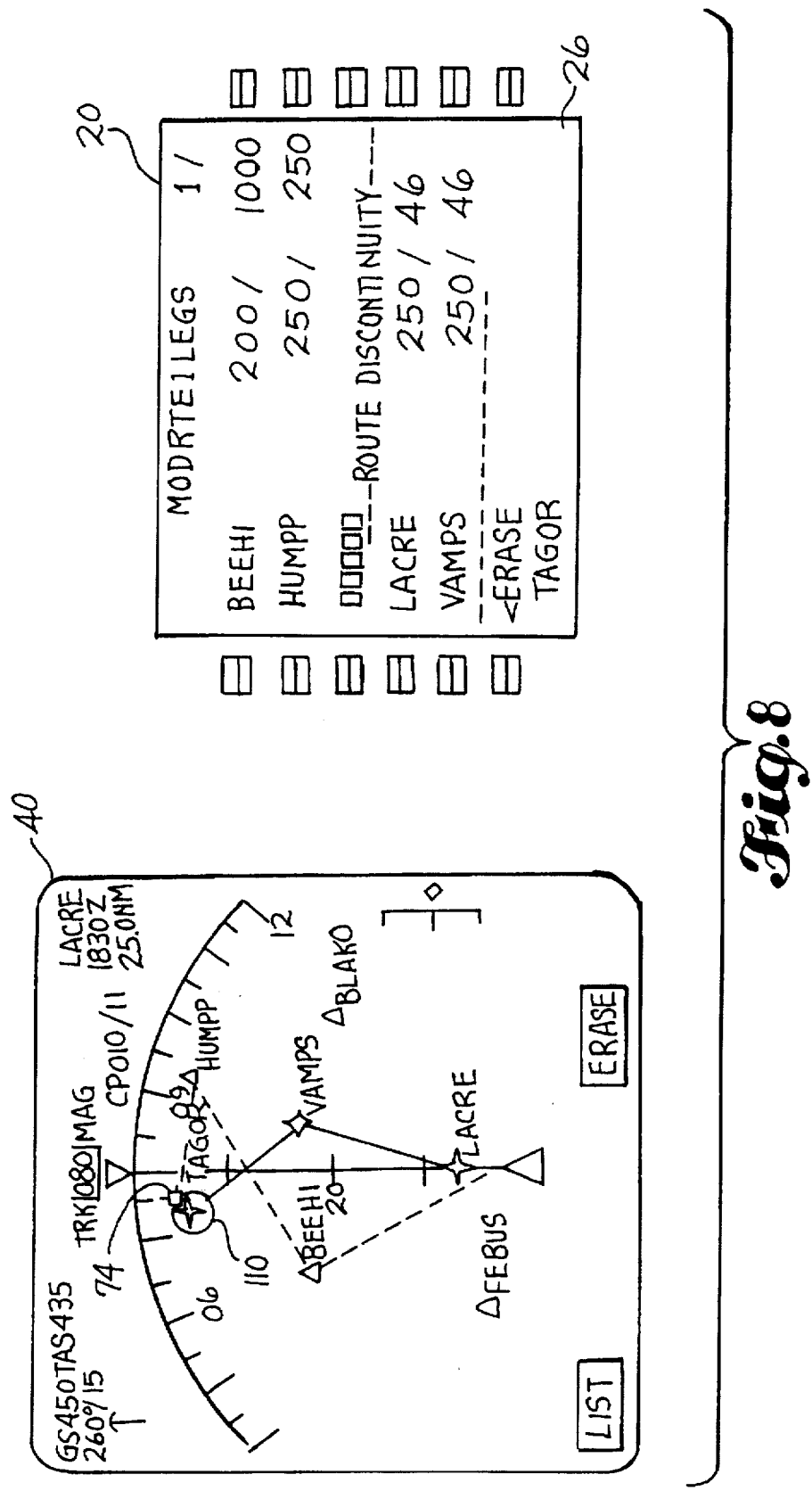

In FIG. 8, the cursor control device has now positioned the cursor 74 within a one half inch diameter of the new waypoint TAGOR at position 110. This causes the TAGOR waypoint to be highlighted and, in the navigation display 20, the waypoint TAGOR is entered in the scratch pad area 26.

Figure 9:
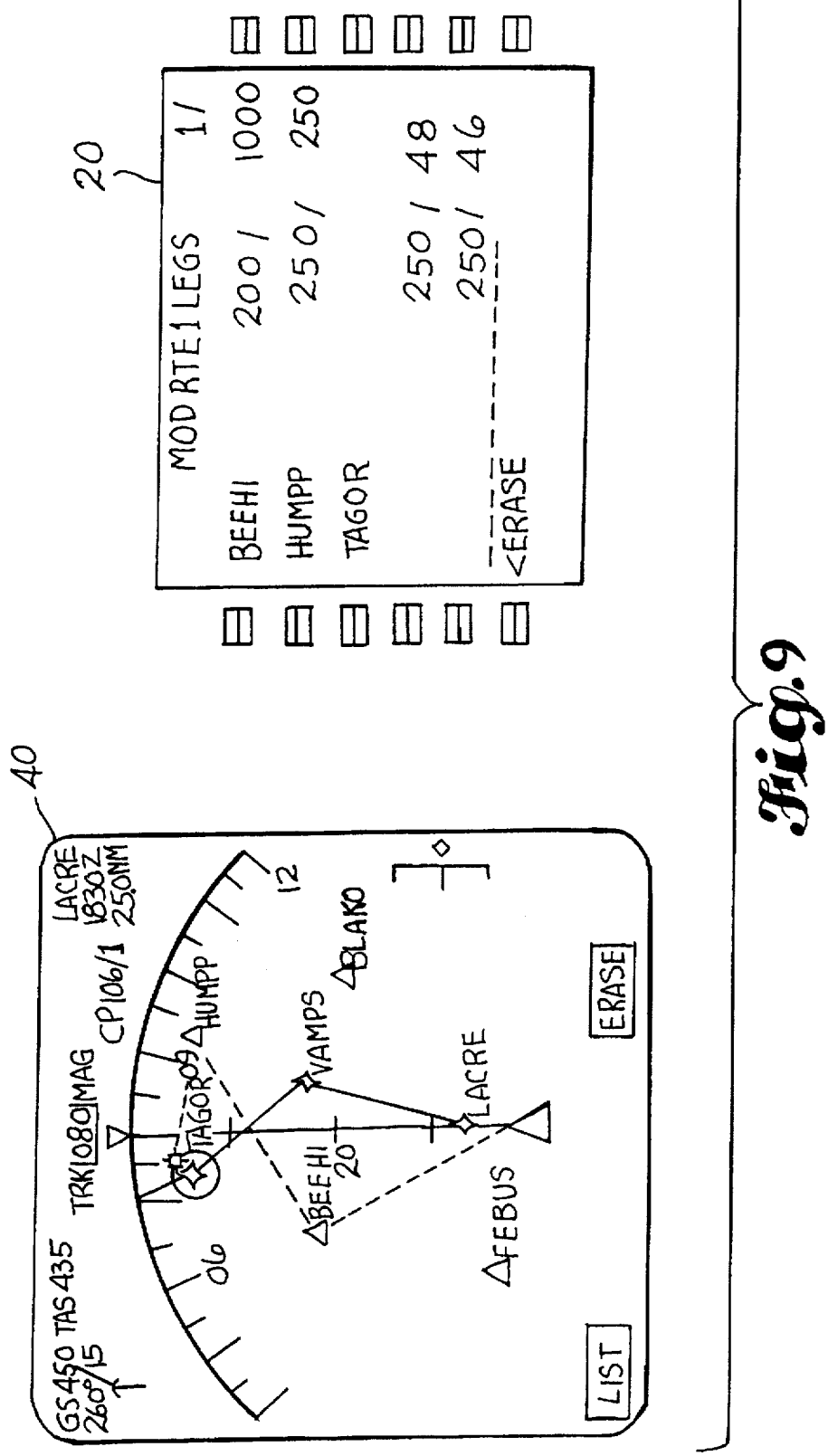

Referring to FIG. 9, the user, using the cursor controlled device selector switch 80, selects the waypoint TAGOR, thereby closing the discontinuity and automatically deleting the waypoints which are no longer on the desired route as reflected by the control display unit display 20.

Thus, as is indicated above with respect to FIGS. 2a-9, the user can easily, and without the requirement of keypad entries, use the cursor control device to implement a "connect the dot" approach to redirecting the route along desired waypoints. These changes reflect not only the navigation display 40 but correspondingly vary the line text readout in the CDU display 20. In addition, if the user prefers to make CDU 20 inputs, these are simultaneously displayed on the navigation display 40. In this way, users are free to use either the graphic interface via the cursor control device and the navigation display or the standard CDU command button entries to control the navigation route.

FIG. 10 is a logic flow diagram that depicts the logic states realized by the logic unit 60, FIG. 1, in accordance with the preferred embodiment of the invention.

At block 200, the logic monitors the cursor control device position and the corresponding cursor control device selection switch state. It then enters block 202 at which point it determines whether or not the cursor has passed within a radius of 0.25 inches of a waypoint symbol on the navigation display. If, out of block 202, the cursor has not passed within the prescribed radius of a waypoint, block 204 is entered and it is determined whether or not there has been a position selected on the navigation display. If, out of block 204, it is determined that no position has been assigned on the navigation display, the system reverts back to block 200, to thereby monitor the cursor control device position and switch selection state. If, out of block 202, it is determined that the cursor symbol has passed within 0.25 inches of a waypoint symbol on the navigation display, block 206 is entered and a white highlight is drawn around that waypoint or those waypoints within the prescribed radius. Two events take place out of block 206. Firstly, the system reverts to block 204 to determine whether or not there has been a position selected on the navigation display. Secondly, the system enters block 208 which causes that highlighted waypoint to be identified in the control display unit scratch pad.

If, at block 204, it has been determined that there has been a waypoint position selected on the navigation display, block 210 is entered. In block 210, a dashed line is drawn between the cursor and the position selected (for example the dashed line between position 42 and 74 as depicted in FIG. 3) and the relative bearing and distance from that position is displayed on the navigational display 40 (such as item 100 in FIG. 3). In addition, this newly created display is continuously updated.

Now, at block 212, it is determined whether or not this is the first position which has been selected.

When the first position is selected, nothing is changed in the fmc. This just sets the position where the route modification will start. Thus, if the first waypoint position has been selected out of block 212, the system reverts to block 200 and continues monitoring the cursor control device and its selection switch state. However, if the second or subsequent positions have been selected out of block 212, block 214 is entered.

In block 214, the flight management computer route is modified with the newly highlighted waypoint entered relative to the previously selected position. The system then reverts to block 200 to continue to monitor the state of the cursor control device and its selection switch state.

As mentioned hereinabove, the user can make route modifications using either the cursor control device and its graphical interface to the flight display or, via the more traditional keyboard entry on the FMS-CDU. Thus, in block 220 the system monitors the CDU keyboard entries. At decision point 222, it is determined whether or not there has been a waypoint manually typed in by the user. If no manual waypoint has been typed in, the system reverts to block 220. However, out of block 222, if a manual waypoint has been typed in, block 208 is entered and that waypoint identifier appears in the CDU scratch pad. Now, in block 224, the CDU line select keys are monitored. The system then enters block 226 to determine whether or not the scratch pad data has been line selected via the line select keys into the desired navigation route. If the scratch pad data has not been line selected into the desired route, the system reverts to monitor the keyboard entries at 220. However, if the scratch pad data has been selected into the desired route, block 228 is entered.

Block 228 causes the flight management computer route to be modified with the waypoint which has been entered in the select position. The system then returns to monitor the keyboard entries of block 220.

In summary, a cursor controlled navigation system has been described in detail. The system utilizes both a navigation display allowing graphical interface input by the user for additions or changes to the desired navigational route while maintaining, in parallel, the flight management system control display unit textual display and the ability to modify or add to the route via standard keyboard entries.

While the preferred embodiment of the invention has been described in detail, it should be apparent that many modifications and variations thereto are possible, all of which fall within the true spirit and scope of the invention.

It is claimed:

1. An aircraft cursor controlled navigation system comprising:

a navigation display for graphically displaying to the flight crew a sequence of waypoints defining a desired aircraft route and said navigation display also depicting a movable cursor;

a manual input cursor control device suited for receiving manual inputs to control the position of said cursor on said navigational display;

a control display unit including a keypad for allowing the typed entry of sequential waypoints to define a desired aircraft route and a text display of said typed entries; and a logic means for directing aircraft flight in accordance with a flight crew input desired route, said logic means including logic for allowing the flight crew to select a new or revised desired route by manually selecting waypoints via the cursor control device with said newly selected waypoints automatically forming the desired route on both said navigation display and as a new or revised text display on said control display unit, said logic means including means for automatically deleting waypoints which are no longer on the desired route.

2. The aircraft cursor controlled navigation system of claim 1 wherein said logic means further includes:

means for drawing a line between a selected waypoint and the cursor position on said navigation display and calculating and displaying the relative bearing and distance from said selected waypoint to said cursor position.

3. The aircraft cursor controlled navigation system of claim 1 wherein said logic means further includes logic for:

determining if said cursor has been positioned within a predetermined position of a waypoint and, if so, highlighting said waypoint on said flight display.

4. The aircraft cursor controlled navigation system of claim 3 wherein said logic means further includes:

means for producing a text display on said control display unit of said highlighted waypoint.

5. The aircraft cursor controlled navigation system of claim 4 wherein said logic means further includes:

means permitting the flight crew to select said text display of said highlighted waypoint as a desired point on the route to thereby automatically enter said waypoint on the desired route.

6. The aircraft cursor controlled navigation system of claim 1 wherein:

said manual input cursor control device comprises a touch pad; and said logic means responds to relative movement of a user's finger across said touch pad to control movement of the cursor on said navigational display.

7. The aircraft cursor controlled navigation system of claim 6 wherein:

said touch pad includes hot pad areas; and said system responds to a user activating a hot pad area to move said cursor to a predetermined position on said navigational display.

8. The aircraft cursor controlled navigation system of claim 3 wherein:

said manual input cursor control device comprises a touch pad; and said logic means responds to relative movement of a user's finger across said touch pad to control movement of the cursor on said navigational display.

9. The aircraft cursor controlled navigation system of claim 8 wherein:

said touch pad includes hot pad areas; and said logic means responds to a user activating a hot pad area to move said cursor to a predetermined position on said navigational display.

10. The aircraft cursor controlled navigation system of claim 9 wherein:

said manual input cursor control device comprises a selector switch; and said logic means responds to a user depressing said selector switch to select said highlighted waypoint as a waypoint on said desired route.

11. The aircraft cursor controlled navigation system of claim 1 wherein said logic means further includes:

means for creating images of one or more predetermined control buttons on said navigation display responsive to the system's current mode of operation, and means for performing the operation represented by said control button image in the event a user, through the manual input cursor control device, selects said control button.

12. The aircraft cursor controlled navigation system of claim 11 wherein said logic means further includes:

means responsive to a user input to display on said navigation display a sequence of said control buttons, each control button corresponding to one of the possible waypoints within range of the display that the flight crew could select for inclusion on the desired route.

13. The aircraft cursor controlled navigation system of claim 11 wherein said logic means further includes:

means responsive to two or more waypoints being too close on said navigation display to be designated for selection, to display a sequence of said control buttons, each control button corresponding to one of said waypoints.

* * * * *